Patented Oct. 6, 1942

2,298,231

UNITED STATES PATENT OFFICE 2,298,231

PRODUCTION OF NITRILES

Albert E. Rainsford, New York, and John H. Pearson, Flushing, N. Y., assignors to General Chemical Company, New York, N. Y., a corporation of New York No Drawing. Application February 29, 1940, Serial No. 321,406

14 Claims. (Cl. 260—464)

This invention relates to a process for production of nitriles and the corresponding acids.

Organic acids have been prepared heretofore by hydrolysis of their nitriles. It has been proposed to prepare nitriles, e. g. the nitriles of aliphatic acids, by reaction of alkyl sulfates and potassium cyanide in aqueous solution. For example, propionitrile has been prepared from diethyl sulfate and an aqueous solution of potassium cyanide. When attempts have been made to substitute the less expensive cyanides, e. g. sodium cyanide, for the potassium cyanide in this reaction yields have been very poor, due to hydrolysis and decomposition of the reactants. In order to utilize sodium cyanide rather than potassium cyanide it has also been proposed to produce propionitrile by heating a dry mix of sodium ethyl sulfate and sodium cyanide. However, in this process the yield is also very low, due to decomposition of the reactants.

It is an object of this invention to provide an improved process for preparing nitriles involving the use of metal cyanides as reactants, in which process the less expensive cyanides such as sodium cyanide may advantageously be used and high yields obtained.

We have discovered that high yields of a nitrile may be obtained by reacting a metal cyanide with a sulfuric or phosphoric acid ester in a non-aqueous, high boiling liquid medium; for example, by mixing the reactants with a non-aqueous liquid boiling above about 130° C. and inert with respect to the reactants and products, and heating the mixture. A nitrile thus produced may be hydrolyzed to form the acid, and esters or other derivatives may be prepared from the acid.

When a metal cyanide is caused to react with a sulfuric or phosphoric acid ester, the products of reaction are a metal sulfate or phosphate and an organic cyanide; for example, sodium cyanide and diethyl sulfate may be reacted to form sodium ethyl sulfate and ethyl cyanide. The organic cyanide thus formed is a nitrile of a carboxylic acid; e. g. ethyl cyanide is the nitrile of propionic acid. Accordingly, the organic cyanide may be hydrolyzed to form the corresponding acid; for example, ethyl cyanide (propionitrile) may be hydrolyzed to propionic acid by heating with an aqueous sulfuric acid solution.

For the reaction between a metal cyanide and a sulfuric or phosphoric acid ester in the absence of water, in accordance with our invention, cyanides such the alkali metal and alkaline earth metal cyanides, and cyanides of heavy metals such as copper and zinc may be employed; alkali metal and alkaline earth metal cyanides are preferred. Our process makes possible the efficient use of inexpensive metal cyanides in the production of nitriles, the use of sodium cyanide being particularly advantageous because of its availability and low cost. For example, by the process of our invention a 90% yield of the nitrile may be obtained with the inexpensive sodium salt; in reacting sodium cyanide and a sulfuric acid ester in an aqueous medium we have found the yield of nitrile product is not above 61%. The process of our invention, therefore, has the important advantage of making possible the use of cheap sodium cyanide to produce a very high yield of nitrile, and the corresponding organic acid and derivatives thereof may accordingly be efficiently produced from sulfuric or phosphoric acid esters by first preparing the nitrile in accordance with our invention.

Esters suitable for the process of our invention may be obtained by reacting sulfuric or phosphoric acid with the corresponding alcohols, by treating olefin hydrocarbons with sulphuric or phosphoric acid, or by other methods. For example, ethylene or other olefins may be reacted with sulfuric acid to form sulfuric acid esters by addition of sulfuric acid to the double bond of the unsaturated hydrocarbon. Ethylene and sulfuric acid, for instance, may be reacted to form diethyl sulfate, propylene and sulfuric acid may be reacted to form di-isopropyl sulfate, and in general the lower olefins may be reacted with sulfuric acid to form the dialkyl sulfates which are particularly suitable for the process of our invention.

The non-aqueous, high boiling liquid medium in which the reaction is carried out may be any liquid which is inert with respect to both the reactants and the products of reaction and which has a boiling point about about 130° C. A number of organic liquids are suitable for this purpose; for example, decahydronaphthalene, tetrahydronaphthalene, xylene, alcohols of high molecular weight, pine oil and chlorinated compounds such as dichlorodiethyl ether. It is preferable to choose a liquid reaction medium which has a boiling point substantially above the boiling point of the nitrile product. We have found decahydronaphthalene, tetrahydronaphthalene and xylene, particularly decahydronaphthalene, to be advantageous as non-aqueous reaction media for the production of the lower boiling nitriles such as propionitrile in accordance with the process of our invention. The above-described high boiling non-aqueous liquid, we have found, prevents hydrolysis of the ester and inhibits decomposition of the cyanide, thereby increasing the yield of nitrile. The use of a non-aqueous, high boiling liquid reaction medium, accordingly, is an important feature of our invention.

In practicing our invention the liquid reaction medium, metal cyanide and ester are mixed, whereupon the ester and cyanide react to form a nitrile; the nitrile product is then separated from the reaction mixture, for example by distillation, the vapors being fractionated, if necessary, to separate the nitrile product from other constituents of the reaction mixture (e. g., liquid reaction medium) which may volatilize. We consider it preferable, however, to employ a liquid reaction medium having a boiling point sufficiently above that of the nitrile to make such fractionation unnecessary.

In the practice of our invention we have found it particularly advantageous to suspend the metal cyanide in the liquid reaction medium, heat the mixture to a temperature substantially above the boiling point of the nitrile product (e. g., about 30° to 60° above the nitrile boiling point) and slowly add the ester to the reaction mixture at such a rate that the reaction temperature is maintained in the desired range. For example, in a preferred method of carrying out the process of our invention sodium cyanide is suspended in a liquid such as decahydronaphthalene, the slurry is heated to a temperature about 30° to 60° above the boiling point of the nitrile product and rapidly agitated while the ester is gradually added thereto at such a rate that the reaction temperature is maintained in the above indicated range. In the production of propionitrile, for example, the reaction temperature is preferably maintained in the range about 130° to 160° C.

We have found the production of nitriles may be carried out with unusually high efficiency when the reaction temperature is maintained as here indicated and accordingly maintenance of reaction temperature as described above and control of ester addition for that purpose are further important features of our invention.

The crude nitrile obtained as above-described may be purified by rectification or may be hydrolyzed without purification directly to the corresponding acid. The hydrolysis of the nitrile to the acid may be accomplished by heating in an aqueous solution of an acid or an alkali; in the preferred operation of our process the hydrolysis is accomplished by agitating and refluxing with an aqueous solution of about 70% sulfuric acid for several hours. The aqueous reaction product may then be treated to recover the organic acid; e. g., the aqueous solution may be extracted with a solvent such as ether or benzene to obtain the acid formed during the reaction. The organic acid thus produced may be used to manufacture salts, esters or other derivatives; for example, from propionic acid there may be prepared propionates, cellulose derivatives, etc., or the acid or its esters may be used in preparing artificial fruit flavors and perfumes.

The process of our invention, as above indicated, is applicable in general to the production of nitriles and corresponding carboxylic acids and other derivatives from sulfuric or phosphoric acid esters. The production of the lower saturated aliphatic acids and their nitriles, especially propionitrile and propionic acid, is of particular importance; as examples of such nitriles and acids there may be mentioned, in addition to propionitrile and propionic acid, the butyronitriles and butyric acids, and the valeronitriles and valeric acids. The production of the lower saturated aliphatic acids and their nitriles is advantageous industrially, in that petroleum cracking still gases constitute a convenient source of lower olefin hydrocarbons from which the lower alkyl sulfates or phosphates may readily be prepared by reaction of the olefins with sulfuric or phosphoric acid. For example, some cracking gases have been found to contain about 30% ethylene, 12% propylene and 6% isobutylene. These unsaturated hydrocarbons may, for example, be reacted with sulfuric acid to form sulfuric acid esters, e. g. diethyl sulfate, di-isopropyl sulfate and di-tertiary butyl sulfate, respectively, and the sulfates thereafter reacted with sodium cyanide in accordance with the process of the invention to form the nitrile of the saturated aliphatic acid having one carbon atom more than the alkyl residue of the sulfuric acid ester; for example, propionitrile is prepared from diethyl sulfate, isobutyronitrile from di-isopropyl sulfate, trimethyl acetonitrile from di-tertiary butyl sulfate, and similar nitriles from other esters. From the nitriles the corresponding acids may be obtained by hydrolysis and other derivatives prepared therefrom as described above.

The following example illustrates the process of our invention. All quantities are in parts by weight.

50 parts of sodium cyanide were suspended in about 88 parts of decahydronaphthalene having a boiling range of 188° to 196° C. The slurry was stirred and heated to 150° to 160° C. Diethyl sulfate was added dropwise to the rapidly agitated slurry until 154 parts of the ester had been added; the amounts used represented equimolar quantities of sodium cyanide and diethyl sulfate. Ethyl cyanide (propionitrile) was formed during the reaction and was removed substantially as quickly as formed by distillation. Since the reaction is highly exothermic the dropwise addition of diethyl sulfate maintained the reaction temperature in the desired range. Upon completion of the reaction about 57 parts of crude ethyl cyanide had been obtained as distillate, 49 parts of which boiled in the range of 96° to 98° C., representing a 90% yield of ethyl cyanide based upon the weight of sodium cyanide charged.

55 parts of crude ethyl cyanide obtained by the above process were mixed with 196 parts of 98% sulfuric acid and 72 parts of water. The mixture was refluxed with stirring for 3 hours. The aqueous reaction mixture was thereafter extracted with ether to obtain propionic acid; the ether solution of propionic acid was dried and distilled to separate the ether from the acid. A 90% yield of propionic acid of boiling range 135° to 140° C. (based on the ethyl cyanide) was obtained.

Similarly, sodium cyanide and triethyl phosphate may be reacted in decahydronaphthalene to form ethyl cyanide, which may then be hydrolyzed to form propionic acid as described above.

Where reference is made in the specification and claims to ethyl, propyl, butyl or alkyl esters (i. e. sulfates or phosphates), the term is intended to be used in its usual general sense, i. e. to include both the mono and poly alkyl esters, and the salts of the acid esters, and to include all isomers of the alkyl group.

Since certain changes may be made in the processes above described without departing from the scope of the present invention, it is intended the description shall be interpreted as illustrative and not in a limiting sense.

What is claimed is:

1. A process which comprises reacting an ester from the group consisting of sulfuric acid and phosphoric acid esters with a metal cyanide in a non-aqueous liquid medium having a boiling point above 130° C. to form a nitrile.

2. A process which comprises reacting an alkyl sulfate with a metal cyanide in a liquid medium having a boiling point above 130° C. to form a nitrile, the reaction being carried out in the substantial absence of water.

3. A process which comprises reacting an alkyl phosphate with a metal cyanide in a liquid medium having a boiling point above 130° C. to form a nitrile, the reaction being carried out in the substantial absence of water.

4. In a process for production of a nitrile by reacting an ester from the group consisting of sulfuric acid and phosphoric acid esters with a metal cyanide, the improvement which comprises carrying out said reaction in a non-aqueous liquid medium having a boiling point above the boiling point of the nitrile and above 130° C.

5. A process which comprises reacting an ethyl ester from the group consisting of sulfuric acid and phosphoric acid esters with a metal cyanide in a non-aqueous liquid medium having a boiling point above 130° C. to form a nitrile.

6. In a process for production of a carboxylic acid, the steps which comprise reacting an ester from the group consisting of sulfuric acid and phosphoric acid esters with a metal cyanide in a non-aqueous liquid medium having a boiling point above 130° C. to form a nitrile, and hydrolyzing the nitrile thus formed.

7. In a process for production of a nitrile by reacting an ester from the group consisting of sulfuric acid and phosphoric acid esters with a metal cyanide, the improvement which comprises adding the ester to the metal cyanide suspended in a non-aqueous liquid reaction medium having a boiling point above the boiling point of the nitrile and above 130° C., at such a rate that the reaction temperature is maintained within a predetermined range above the boiling point of the nitrile.

8. A process which comprises reacting an ester from the group consisting of sulfuric acid and phosphoric acid esters with a cyanide from the group alkali metal and alkaline earth metal cyanides in a non-aqueous liquid medium having a boiling point above 130° C. to form a nitrile.

9. A process which comprises reacting ethyl sulfate with a cyanide from the group alkali metal and alkaline earth metal cyanides in a non-aqueous liquid medium selected from the group decahydronaphthalene, tetrahydronaphthalene and xylene, to form a nitrile.

10. A process which comprises reacting ethyl phosphate with a cyanide from the group alkali metal and alkaline earth metal cyanides in a non-aqueous liquid medium selected from the group decahydronaphthalene, tetrahydronaphthalene and xylene, to form a nitrile.

11. In a process for the production of a nitrile by reacting ethyl sulfate with sodium cyanide, the improvement which comprises gradually adding the ethyl sulfate to the sodium cyanide suspended in a non-aqueous liquid medium selected from the group decahydronaphthalene, tetrahydronaphthalene, and xylene, at such a rate that the reaction temperature is maintained within the range about 130° to about 160° C.

12. In a process for the production of a nitrile by reacting ethyl phosphate with sodium cyanide, the improvement which comprises gradually adding the ethyl phosphate to the sodium cyanide suspended in a non-aqueous liquid medium selected from the group decahydronaphthalene, tetrahydronaphthalene, and xylene, at such a rate that the reaction temperature is maintained within the range about 130° to about 160° C.

13. In a process for production of propionic acid, the steps which comprise heating an ethyl ester from the group consisting of sulfuric acid and phosphoric acid esters with sodium cyanide in a non-aqueous liquid medium comprising decahydronaphthalene to form propionitrile, and hydrolyzing the nitrile thus formed to propionic acid.

14. In a process for the production of a nitrile by reacting an ester from the group consisting of sulfuric acid and phosphoric acid esters with a metal cyanide, the improvement which comprises gradually adding the ester to the metal cyanide suspended in a non-aqueous liquid medium having a boiling point above the boiling point of the nitrile and above 130° C., at such a rate that the reaction temperature is maintained within the range about 30° to about 60° above the boiling point of the nitrile product.

ALBERT E. RAINSFORD.
JOHN H. PEARSON.